United States Patent [19]

Luckenbach

[11] Patent Number: 5,156,817
[45] Date of Patent: Oct. 20, 1992

[54] FCCU REGENERATOR CATALYST DISTRIBUTION SYSTEM

[75] Inventor: Edward C. Luckenbach, Mountainside, N.J.

[73] Assignee: Exxon Research and Engineering Company, Florham Park, N.J.

[21] Appl. No.: 523,518

[22] Filed: May 15, 1990

[51] Int. Cl.⁵ .................... F27B 15/10; B01J 8/24
[52] U.S. Cl. .................... 422/144; 422/139; 422/143; 422/145
[58] Field of Search ............. 422/139, 143, 144, 145

[56] References Cited

U.S. PATENT DOCUMENTS

| | | | |
|---|---|---|---|
| 2,412,212 | 5/1947 | Medlin | 422/139 X |
| 2,948,671 | 8/1960 | Packie et al. | 422/143 X |
| 3,298,792 | 1/1967 | DiDrusco | 422/143 |
| 3,902,990 | 9/1975 | Luckenbach | 422/144 X |
| 3,974,091 | 8/1976 | Parker et al. | 422/144 X |

Primary Examiner—Robert J. Warden
Assistant Examiner—Amalia Santiago
Attorney, Agent, or Firm—Chris P. Konkol; Roy J. Ott

[57] ABSTRACT

Disclosed are devices for introducing and uniformly distributing spent catalyst into a regenerator bed of a fluid catalytic cracking unit. Also disclosed are devices for collecting and discharging regenerated catalyst from the regenerator bed. The devices provide more uniform contacting of the spent catalyst particles with regeneration gas and consequently more efficient and complete regeneration.

14 Claims, 4 Drawing Sheets

FCCU REGENERATOR CATALYST DISTRIBUTION SYSTEM

BACKGROUND OF THE INVENTION

1. Field of the Invention

The present invention relates to the regeneration of catalysts employed in a fluid catalytic cracking process. More particularly, this invention relates to the introduction of spent catalyst into a regeneration zone by means of a catalyst distribution system comprising stationary distributor arms. A further aspect of the invention relates to the discharge of regenerated catalyst from the regeneration zone by means of a collection system comprising a shrouded catalyst outlet.

2. Description of the Prior Art

The fluidized catalytic cracking of hydrocarbons is well known in the prior art and may be accomplished by a variety of processes which employ fluidized solid techniques. Normally in such processes, preheated, relatively high molecular weight hydrocarbon liquids and/or vapors are contacted with hot, finely-divided, solid catalyst particles either in a fluidized bed reaction zone or in an elongated riser reaction zone. The mixture of hydrocarbons and catalyst is maintained at an elevated temperature in a fluidized state for a period of time sufficient to effect the desired degree of cracking to lower molecular weight hydrocarbons typical of those present in motor gasolines and distillate fuels.

During the cracking reaction, coke is deposited on the catalyst particles in the reaction zone, thereby reducing the activity of the catalyst for cracking and the selectivity of the catalyst for producing gasoline blending stock. In order to restore a portion, preferably a major portion, of the activity to the coke contaminated or spent catalyst, the catalyst is transferred from the reaction zone into a regeneration zone. A typical regeneration zone comprises a large vertical substantially cylindrical vessel wherein the spent catalyst is maintained as a fluidized bed by the upward passage of an oxygen-containing regeneration gas such as air. The fluidized catalyst forms a dense phase catalyst bed in the lower portion of the vessel and a dilute catalyst phase containing entrained catalyst particles above, with an interface existing between the two phases. The catalyst is contacted with the oxygen-containing regeneration gas under conditions sufficient to burn at least a portion, preferably a major portion, of the coke from the catalyst. Flue gas, which normally comprises gases arising from the combustion of the coke on the spent catalyst, inert gases such as nitrogen from air, any unconverted oxygen, and entrained catalyst particles, are then passed from the dilute catalyst phase into solid-gas separators within the regeneration zone (e.g., cyclone separators) to prevent excessive losses of the entrained catalyst particles. The catalyst particles separated from the flue gas are returned to the dense phase catalyst bed. The regenerated catalyst is subsequently withdrawn from the regeneration zone and re-introduced into the reaction zone for reaction with additional hydrocarbon feed.

For maximum process efficiency, it is important that there should be uniform dispersal and distribution of the spent catalyst entering the fluidized bed of the FCCU regenerator. For example, dead catalyst zones will cause deactivation of the catalyst. On the other hand, if the catalyst exits the regenerator by a shortcut before being adequately dispersed, it will experience incomplete regeneration. It has been estimated that several pecent, for example 2 to 5 percent, of the catalyst typically short-circuits the regenerator bed and is therefore not sufficiently regenerated.

In the prior art, spent catalyst typically enters the regenerator vessel through a riser, or vertical conduit, which terminates just above a grid. It is known to deflect the incoming catalyst flow by means of a flat plate above the riser outlet. However, there is usually no positive distribution of the incoming catalyst throughout the bed. As a result of incomplete distribution, concentration gradients of the gases leaving the regenerator bed are produced and localized afterburning, in the cyclones above the riser or above the overflow well, may occur.

It has been the practice to merely correct the symptom of afterburning, by providing more holes in the regenerator grid near the spent catalyst entrance. In some units 55% of the regenerator grid holes are in the side of the grid near the riser. However, this unequal hole distribution results in bed velocities much higher in this area, particularly when taking into account the 10% regenerator air entering with the spent catalyst. These high gas velocities cause shorter gas residence time in the bed in this area. They also cause pronounced gulf-streaming of the catalyst in the bed, which brings high-carbon partially regenerated catalyst to the top of the bed where it can short-circuit to the overflow well outlet. The high gas velocities also increase entrainment in that area of the regenerator vessel. This is a particular debit to a unit running at maximum velocity as limited by entrainment. Thus, there would be a capacity credit for even distribution. Of course, if there is uniform gas composition leaving the dense phase fluidized bed, then there would be a much reduced chance for afterburning, thus correcting the cause of the problem rather than the symptom.

It is also conventional to employ an overflow well to collect regenerated catalyst from the regenerator bed for return to the reaction zone. Such an overflow well also provides for control of bed height, particularly if gas/solids in-flow perturbations occur. However, the conventional overflow well is subject to certain problems. Typically, in a fluidized bed such as in the regenerator, both dense phase solids and also regions of lower density "bubbles" rise through the bed, with phase disengagement occurring at the top of the bed. It is known that the bubbles rising through the regenerator bed, 95% of gas flow, have a particle wake and tend to drag catalyst to the top of the bed very quickly. The catalyst particles then gradually migrate downward in the bed. Thus, a conventional overflow well can be fed by high-carbon spent catalyst that has been brought to the top by the bubbles. It is known to shield the overflow well or catalyst outlet from the top of the bed by a shroud, so to prevent somewhat this bypassing. Preferably, the entry to the space above the overflow well is selected to provide the lowest-carbon catalyst, and the top of the shroud is restricted to reduce the amount of entrained catalyst entering. Prior art shrouds are shown in commonly assigned U.S. Pat. Nos. 3,902,990 and 3,958,953.

Solids distributors have been used outside the field of the invention. For example, U.S. Pat. No. 3,784,108 discloses the use of equal rotating radial arms for distributing solids in a fluid bed combustor. Similarly, U.S. patent teaches a rotating radial arm feed device. These prior art devices have arms that rotate, whereas the subject invention employs a plurality of stationary arms. The Kellogg Company is believed to employ spent catalyst distributors in their catalytic cracking units, although the specific details are not public to applicant's knowledge.

An object of the present invention is therefore to provide an apparatus for maximizing the dispersion and distribution of the catalyst in the regeneration zone of a fluid catalytic cracking unit, so to prevent both catalyst dead spots and by-passing of the bed, and to thereby achieve sufficient residence time for the desired regeneration of spent catalyst.

BRIEF SUMMARY OF THE INVENTION

The present invention relates to mechanical devices to improve the introduction of spent catalyst into the regenerator bed of a fluid catalytic cracking unit and to improve the subsequent discharge of regenerated catalyst. Improved catalyst (solids) distribution into the regenerator bed is achieved, in one preferred embodiment, by the use of a catalyst distribution system comprising a riser cap with a plurality of substantially stationary arms radiating therefrom. Each arm is provided with an internal passage or channel formed longitudinally therein, each internal channel communicating with one or more elongated apertures or outlet slots for the fluidized catalyst.

To assist in the discharge of the regenerated catalyst from the regenerator bed, a collection system is disclosed, comprising a shroud surrounding the regenerated catalyst outlet, which shroud is open above the surface of the dense phase catalyst regenerator bed and, in one preferred embodiment, has inlet orifices for the entry of regenerated catalyst within the shroud, prior to the catalyst exiting the regenerator bed via an outlet conduit.

The mechanical devices disclosed herein contribute to optimal catalyst distribution in the regenerator bed and avoid catalyst short-circuiting or dead spots. They also permit more even distribution of the regeneration gas (preventing afterburning) and minimize entrainment of unreacted catalyst.

BRIEF DESCRIPTION OF THE DRAWINGS

The invention will be more clearly understood upon reference to the detailed discussion below in conjunction with the drawings wherein.

DETAILED DESCRIPTION OF THE INVENTION

Figure 1:
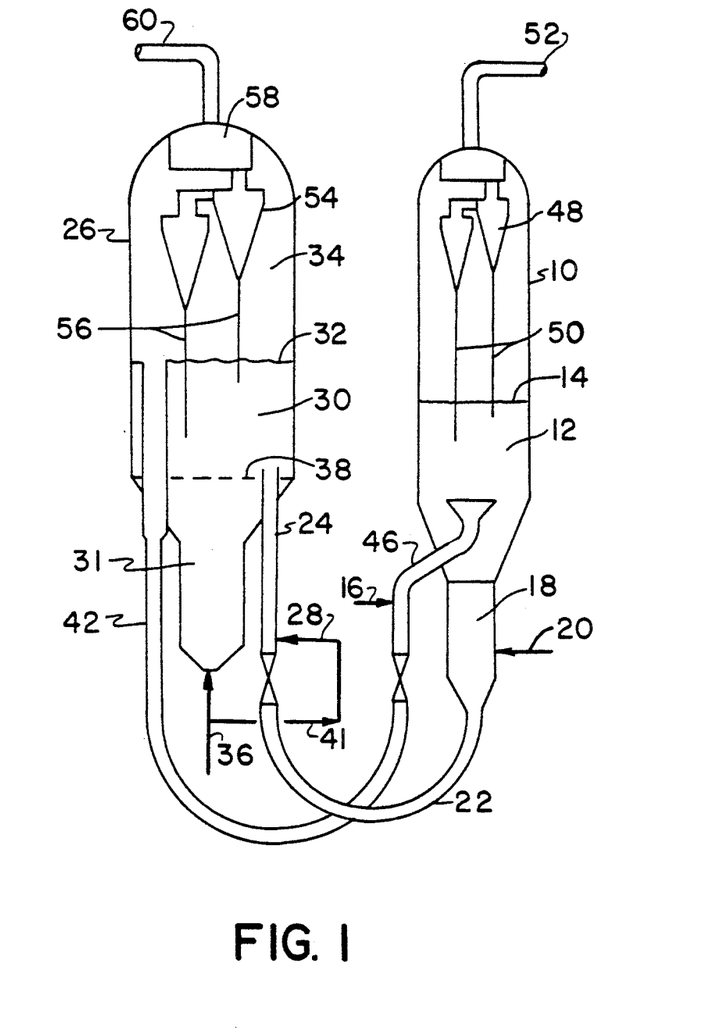
FIG. 1 shows a diagram of a first type of prior art fluid catalytic cracking apparatus to which the present invention is applicable.
Figure 2:
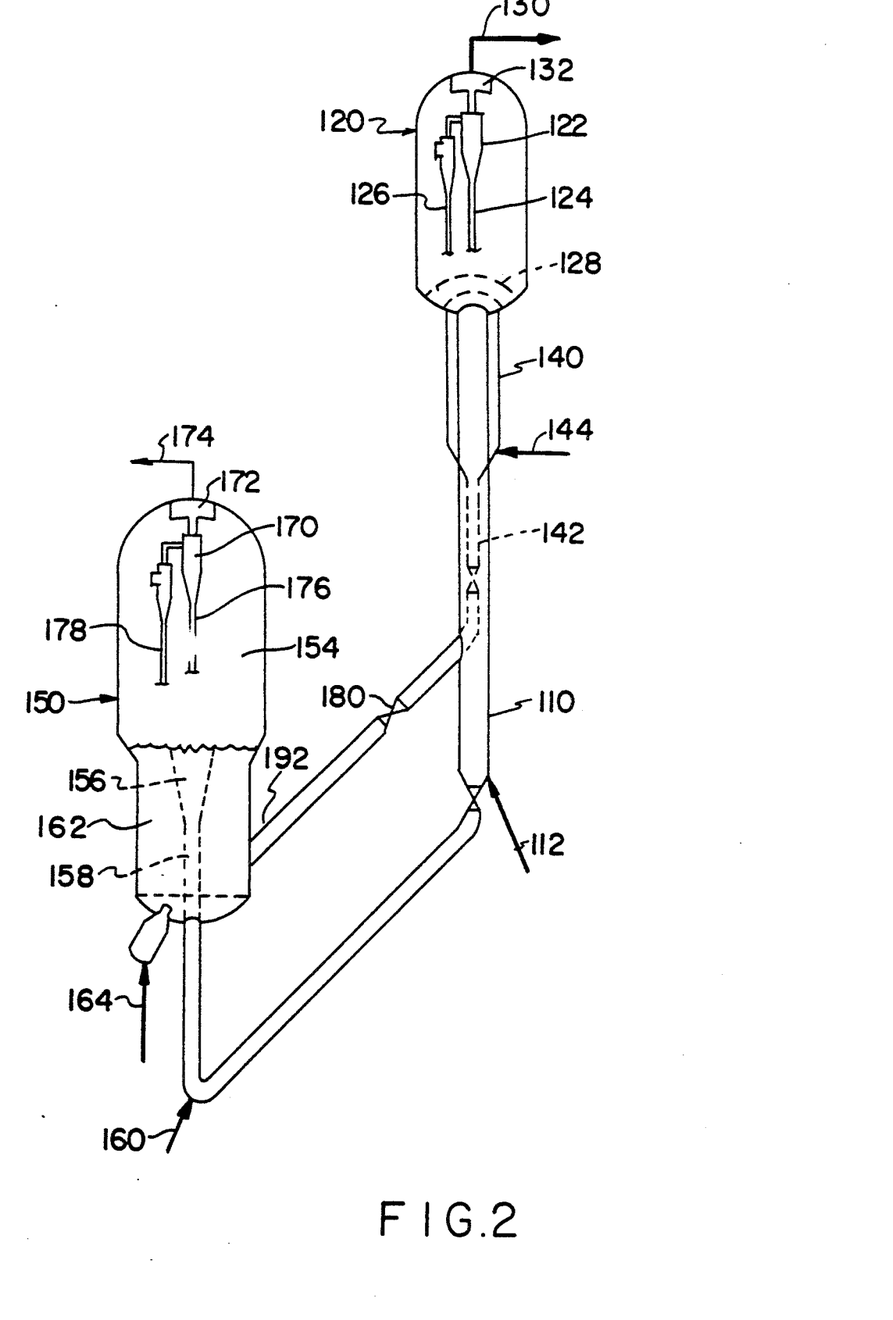
FIG. 2 shows a diagram of a second type of prior art fluid catalytic cracking apparatus to which the present invention is applicable.

Having thus described the invention in general terms, reference is now made to the drawings, which illustrate various embodiments of the present invention. FIGS. 1 and 2 first illustrate typical prior art fluid catalytic cracking units to which the present invention is applicable. Various items such as valves, pumps, compressors, steam lines, instrumentation and other process equipment and control means have been omitted from the figures for the sake of simplicity.

Referring now to FIG. 1, there is shown a vertically arranged cylindrical reaction zone 10 containing a fluidized bed 12 of catalyst having a level indicated at 14 in which a hydrocarbon feedstock introduced at line 16 is undergoing catalytic cracking. Hydrocarbon feedstocks that can be suitably employed in a fluid catalytic cracking process include naphthas, light gas oils, heavy gas oils, wide-cut gas oils, vacuum gas oils, kerosenes, decanted oils, residual fractions, reduced crude oils, cycle oils derived from any of these, as well as suitable fractions derived from shale oil kerogen, tar sands bitumen processing, synthetic oils, coal hydrogenation, and the like. Such feedstocks may be employed singly, separately in parallel reaction zones, or in any desired combination. Hydrocarbon gas and vapors passing through fluid bed 12 maintain the bed in a dense turbulent fluidized condition having the appearance of a boiling liquid. After passing through cyclones 48, wherein catalyst particles are returned to the bed via diplegs 50, the hydrocarbon product, in vapor or gas form, exits the reactor through conduit 52.

In reaction zone 10, the cracking catalyst becomes spent during contact with the hydrocarbon feedstock due to the deposition of coke thereon. Thus, the terms "spent" or "coke-contaminated" catalyst as used herein generally refer to catalyst which has passed through a reaction zone and which contains a sufficient quantity of coke thereon to cause activity loss to an extent requiring regeneration. Generally, the coke content of spent catalyst can vary anywhere from about 0.5 to about 5 wt. % or more. Typically, spent catalyst coke content varies from about 0.5 to about 1.5 wt. %.

Prior to actual regeneration, the spent catalyst is usually passed from the reaction zone into a stripping zone 18 and contacted therein with a stripping gas, which is introduced into the lower portion of zone 18 via line 20. The stripping gas serves to remove most of the volatile hydrocarbons from the spent catalyst. A preferred stripping gas is steam, although nitrogen, other inert gases or flue gas may be employed.

Stripped spent catalyst from which most of the volatile hydrocarbons have been stripped, is then passed from the bottom of stripping zone 18, through a spent catalyst transfer line, such as U-bend 22 and interconnected vertical riser 24, which extends into the lower portion of a regeneration zone 26.

Riser 24 is shown entering regeneration zone 26 off-center to avoid interference with the auxiliary heating air from section 31 of the regeneration zone. Air is added to riser 24 through line 41 and line 28 in an amount sufficient to reduce the density of the catalyst flowing therein, thus causing the catalyst to flow upward into the regeneration zone 26 by simple hydraulic balance.

In the particular configuration shown in FIG. 1, the regeneration zone is in a separate vessel (arranged at approximately the same level as reaction zone 10) containing a dense phase catalyst bed 30 having a level indicated at 32, above which is a dilute catalyst phase 34. The catalyst in the dense phase catalyst bed 30 undergoes regeneration to burn off coke deposits formed in the reaction zone during the cracking reaction. An oxygen-containing regeneration gas enters the lower portion of regeneration zone 26 via line 36 and passes up through a grid 38 and the dense phase catalyst bed 30, maintaining said bed in a turbulent fluidized condition similar to that present in reaction zone 10. The regenerator shown in FIG. 1 is improved by the present invention, as will be discussed in more detail hereinbelow. The present invention resides in modifying the regenerator portion of the catalytic cracking system of FIG. 1 by passing the spent catalyst entering the regenerator through a distribution system comprising at least one distributor arm and also passing the regenerated catalyst through a collection system prior to exiting the regenerator.

As is conventional, flue gases formed in regeneration zone 26 during regeneration of the spent catalyst pass from the dense phase catalyst bed 30 into the dilute catalyst phase 34 along with entrained catalyst particles. The catalyst particles are separated from the flue gas by a suitable gas-solid separators 54 and returned to the dense phase catalyst bed 30 via diplegs 56. The substantially catalyst-free flue gas then passes into a plenum chamber 58 prior to discharge from the regeneration zone 26 through line 60. Typically, the flue gas will contain less than about 0.2, preferably less than 0.1, and more preferably less than 0.05 volume % carbon monoxide. However, in partial combustion operation, the carbon monoxide content may increase to about 8 to 13 percent. Typically, the oxygen content will vary from about 0.4 to about 7 vol. %, preferably from about 0.8 to about 5 vol. %, more preferably from about 1 to about 3 vol. %, most preferably from about 1.0 to about 2 vol. %. The regenerated catalyst is returned to the reactor via line 42.

Oxygen-containing regeneration gases which may be employed in the process of the present invention are those gases which contain molecular oxygen in admixture with a substantial portion of an inert diluent gas. Air is a particularly suitable regeneration gas. Alternatively, air enriched with oxygen may be employed. Additionally, if desired, steam may be added to the dense phase bed along with the regeneration gas or separately therefrom to provide additional inert diluents and/or fluidization gas. Typically, the specific vapor velocity of the regeneration gas will be in the range of from about 0.8 to about 6.0 feet/sec, preferably from about 1.5 to about 4 feet/sec.

Referring to FIG. 2, an alternate embodiment of a catalytic cracking unit to which the subject invention is applicable is shown. The operation of this embodiment is generally similar to that previously described in FIG. In this embodiment, however, a riser reaction zone 110 comprises a tubular, vertically extending vessel having a relatively large height in relation to its diameter. Reaction zone 110 communicates with a disengagement zone 120, shown located a substantial height above a regeneration zone 150. The catalyst circulation rate is controlled by a valve means, such as slide valve 180, located in spent catalyst transfer line 142 extending between disengagement zone 120 and regeneration zone 150. In this embodiment hydrocarbon feedstock is injected through line 112 into riser reaction zone 110 having a fluidized bed of catalyst to catalytically crack the feedstock. Steam may be injected through lines 160 and 162 into return line 158 extending between regeneration zone 150 and reaction zone 110 to serve as a diluent, to provide a motive force for moving the hydrocarbon feedstock upwardly and for keeping the catalyst in a fluidized condition.

The vaporized, cracked feedstock products pass upwardly into disengagement zone 120 where a substantial portion of the entrained catalyst is separated. The gaseous stream then passes through a gas-solid separator, such as two stage cyclone 122, which further separates out entrained catalyst and returns it to the disengagement zone through diplegs 124 and 126. The gaseous stream passes into plenum chamber 132 and exits through line 130 for further processing (not shown). The upwardly moving catalyst in reaction zone 110 gradually becomes coated with carbonaceous material which decreases its catalytic activity. When the catalyst reaches the top of reaction zone 110, it is redirected by grid 128 into stripping zone 140 and subsequently into spent catalyst transfer line 142, where it is contacted by a stripping gas, such as steam, entering through line 144, to partially remove the remaining volatile hydrocarbons from the spent catalyst. The spent catalyst then passes through spent catalyst transfer line 142 into dense phase catalyst bed 152 of regeneration zone 150. Oxygen containing regeneration gas enters dense phase catalyst bed 152 through line 164 to maintain the bed in a turbulent fluidized condition, similar to that in riser reaction zone 110. Regenerated catalyst gradually moves upwardly through dense phase catalyst bed 152, eventually flowing into a conventional overflow well 156 communicating with return line 158. Return line 158 is shown exiting through the center of dense phase catalyst bed 152, and communicating with riser reaction zone 110.

Flue gas formed during the regeneration of the spent catalyst passes from the dense phase catalyst bed 152 into dilute catalyst phase 154. The flue gas then passes through cyclone 170 into plenum chamber 172 prior to discharge through line 174. Catalyst entrained in the flue gas is removed by cyclone 170 and is returned to catalyst bed 152 through diplegs 176, 178.

The regeneration zone normally comprises a vertical generally cylindrical vessel wherein the catalyst to be regenerated is maintained as a fluidized bed by the upward passage of the oxygen-containing regeneration gas thereby forming, as mentioned above, a dense phase catalyst bed and a dilute catalyst phase with an interface in-between. The dense phase bed, which is usually located in the lower portion of the regeneration zone, is maintained at a temperature in the range of from about 1150° to 1400° F., preferably from about 1250° to 1320° F. The density of the dense phase bed may suitably range from about 8 to about 30 lb/ft$^3$.

The construction of the regeneration zone equipment described herein can be made with any material sufficiently able to withstand the relatively high temperatures involved if afterburning is encountered within the vessel and the high attrition conditions which are inherent in systems wherein fluidized catalyst is regenerated and transported. Specifically, metals are contemplated which may or may not be lined. More preferably, ceramic liners are contemplated within any and all portions of the regeneration zone together with alloy use and structural designs in order to withstand the erosive conditions and temperatures of about 1400° F. and, for reasonably short periods of time, temperatures which may be as high as 1800° F.

The pressure in the regeneration zone is usually maintained in a range from about atmospheric to about 50 psig, preferably from about 10 to 50 psig. It is preferred, however, to design the regeneration zone to withstand pressure of up to about 100 psig. Operation of the regeneration zone at increased pressure has the effect of promoting the conversion of carbon monoxide to carbon dioxide and reducing the temperature level within the dense bed phase at which the substantially complete combustion of carbon monoxide can be accomplished. The higher pressure also lowers the equilibrium level of carbon on regenerated catalyst at a given regeneration temperature.

The residence time of the spent catalyst in the regeneration zone suitably can vary from about 1 to about 6 minutes; typically, from about 2 to about 4 minutes. The residence time of the flue gas may vary from about 10 to about 60 seconds in the regeneration zone and from about 2 to about 15 seconds in the dense phase bed.

Figures 3, 5, 6:
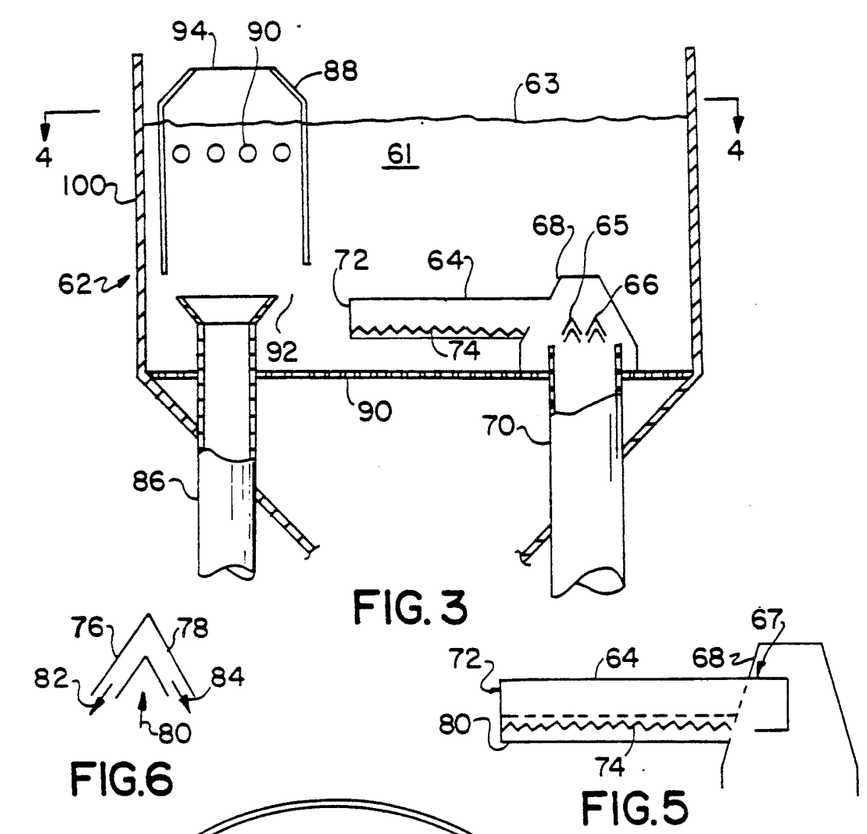
FIG. 3 shows a bottom portion of a regenerator in elevational cross-section, wherein a first embodiment of the invention comprises, at the inlet, a spent catalyst distribution system and, at the outlet, a regenerated catalyst collection system.
FIG. 5 shows a distributor arm of the spent catalyst distribution system of FIGS. 3 and 4 in side view.
FIG. 6 shows a distributor arm of the spent catalyst distribution system of FIG. 5 in transverse end-view.

A better understanding of the present invention may be obtained by reference to FIG. 3 showing in detail a portion of a regenerator 62 within a regenerator shell or wall 100. Spent catalyst from a stripping zone (not shown) is introduced via inlet riser conduit 70 into a dense phase catalyst bed 61, having a bed level 63. Regenerated catalyst from the dense phase catalyst bed 61 flows downward through a standpipe 86. By the term "regenerated catalyst" is meant catalyst leaving the regeneration zone which has contacted an oxygen-containing gas causing at least a portion, preferably a substantial portion, of the coke present on the catalyst to be removed. More specifically, the carbon content of the regenerated catalyst can vary anywhere from about 0.01 to about 0.5 wt. %, but preferably is from about 0.01 to about 0.1 wt. percent.

In FIG. 3, the spent catalyst is evenly introduced into the regenerator bed through a cap 68, suitably conical in shape, which covers the spent catalyst riser outlet near grid 90 at the bottom of the regenerator bed. This grid 90 typically has an even hole distribuiton. The cap 68 has several arm-like extensions 64, 65, and 66, hereafter referred to as distributor arms, which duct the incoming spent catalyst and evenly discharge it through the bed. As will be shown with reference to FIGS. 4 and 5, the bottom of each of the arms are provided with one or more inverted open channels which restrict the catalyst discharge and force flow to the end of each arm.

Referring to both FIGS. 3 and 5, a distributor arm 64 is shown in side-view. A proximate end portion 67 is shown connected to the cap 68 covering the inlet riser conduit 70, which conduit in operation transports spent catalyst into the regenerator 62. At the distal end of the distributor arm 64, a vapor stop 72 blocks further flow of catalyst. The bottom edge 74 of the distributor arm 64 is shown toothed or serrated along its length to assist in the more even discharge of catalyst and gas at a range of inflowing rates. In FIG. 6, the distributor arm is seen to have a triangular cross-section with sides 76 and 78. This shape prevents dead catalyst zones from forming above the arms, which can result in catalyst deactivation. Typically, cracking catalysts have an angle of repose of about 78 degrees. A bottom piece 80 extends along a length of the arm and defines a continuous channel connected to elongated outlet slots 82 and 84 for discharge of catalyst and admixed gases. As evident, the slots face downward and are dimensioned to ensure that the gas is propelled out, but not so high that erosion occurs. A slot and/or channel may be wider at its end and narrower at its beginning to take into account the diminishing velocity of the gas as it escapes through the outlet slot. The toothed or serrated notched edge produces a uniform weir effect, wherein the gas flows out the riser conduit at a sufficiently high velocity.

In the subject invention, the velocity of the gas, entering the regenerator admixed with catalyst, is about 10 ft/sec. Thus the catalyst solids are not in a dense phase flow regime, but rather in a semi- dilute phase flow. The density of the solids stream is 10 to 25 lb/ft$^3$. In strictly dense phase flow, the density would be close to 45 lb/ft$^3$. This density range is the reason the present does not require a rotating means. There is enough gas admixed with the solids to insure distribution through the apparatus.

Referring again to FIG. 3, a regenerator catalyst collection system is also shown, wherein a regenerated catalyst outlet conduit 86 is concentrically surrounded and partially covered by a substantially cylindrical baffle or shroud generally designated 88. The shroud can be supported by posts (not shown) connected to the grid, outlet conduit and/or wall of the regenerator. A number of catalyst entry holes 90 are shown on the side of the shroud. The catalyst in the regenerator bed can also exit via a downwardly facing annular aperature or slot 92 surrounding a funnel shaped extension of the outlet conduit 86. A substantially circular opening 94 at the top portion of the shroud 88 permits the level of the bed 63 to remain uniform.

Figure 4:
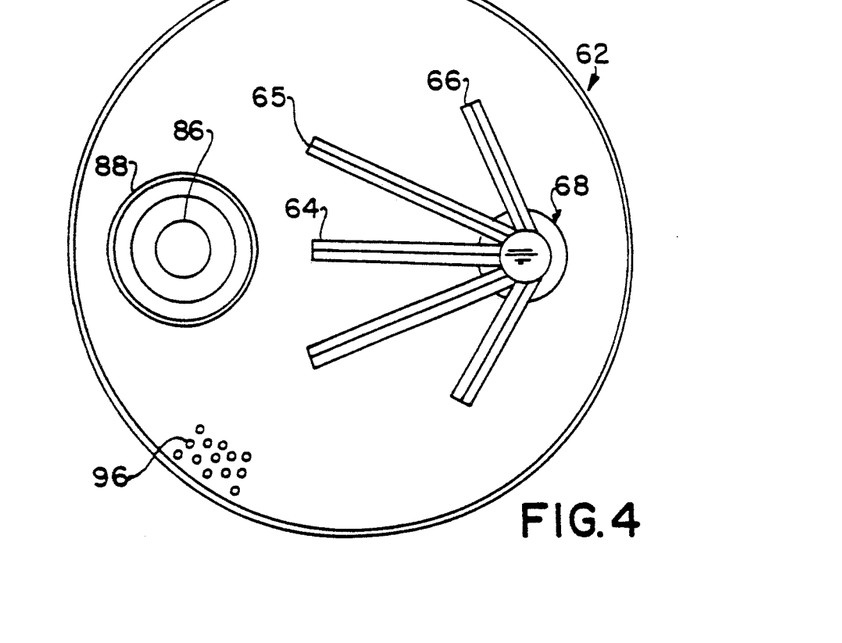
FIG. 4 shows the apparatus of FIG. 3 in plan-view, looking down from the top of the regenerator, wherein it is seen that the spent catalyst distribution system comprises a plurality of radial distributor arms, and the regenerated catalyst collection system comprises a substantially concentric shroud surrounding a catalyst outlet conduit.

FIG. 4 shows the regenerator 62 of FIG. 3 in plan-view. Illustrative grid holes 96 are shown, which distribute the incoming regeneration air. A plurality of spent catalyst distributor arms 64, 65 and 66 are seen to radiate from the conical cap 68. Preferably each of the arms is in the form of a blade extending from the conical cap 68 and having an elongated channel extending longitudinally of the arm, as discussed with regard to FIGS. 3 and 6. Two elongated outlet slots may be coextensive with said channel or there may be a series of shorter slots for the discharge of the catalyst and admixed gas. Each arm may extend radially of the conical cap perpendicularly to the axis thereof. Alternatively, each arm may radiate from the axis of the cap at an angle thereto. A downwardly sloping distributor arm prevents solids from settling out within the arm. It is also possible to have a ring section (not shown) connecting a plurality of arms.

Suitably each of the above-mentioned catalyst distributor arms are attached to the conical cap in a moving or sliding joint connected by a flange. This is preferable to a mechanical design involving welding, since mechanical forces can cause cracks which shorten run lengths. If there is no reason to join or weld an edge, then flexibiltiy and simplicity of design are preferred.

Figure 7:
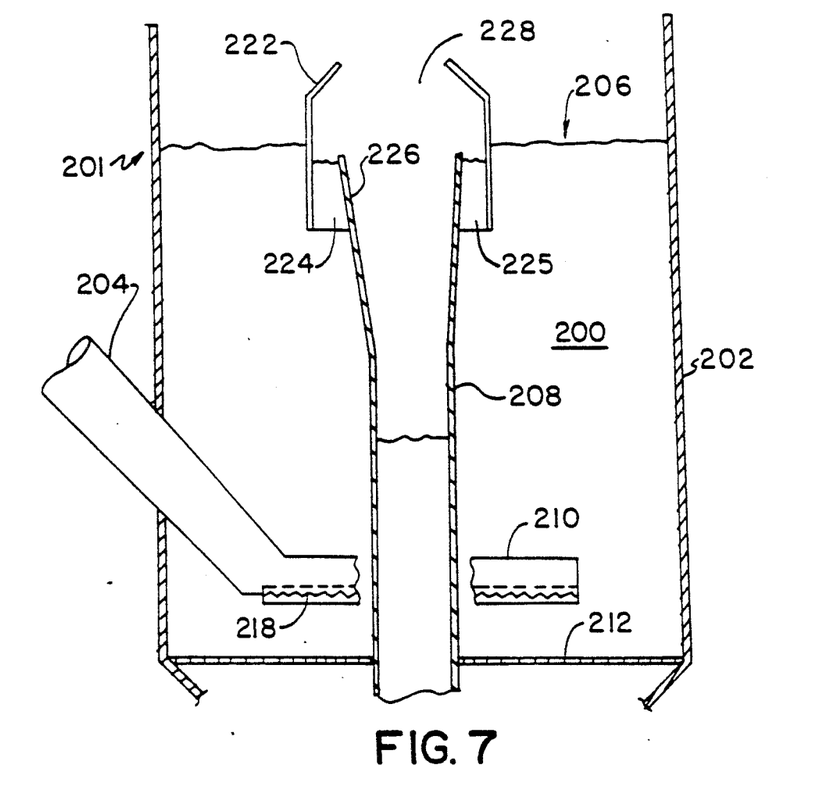
FIG. 7 shows a bottom portion of a regenerator in elevational cross-section, wherein a second embodiment of the invention comprises, at the inlet, a spent catalyst distribution system entering from the left side of the regenerator and, at the center of the regenerator, a regenerated catalyst collection system.

FIG. 7 shows application of the present invention to the type of catalytic cracking unit in FIG. 2. A regenerator zone 201 within a regenerator wall 202 has a dense phase fluidized bed 200 of level 206. Spent catalyst from a stripping zone (not shown) is introduced into the dense phase catalyst bed 200 of the regeneration zone via inlet conduit 204, which is shown entering the left side of the regenerator wall 202. Regenerated catalyst from the dense phase catalyst bed 200 of regeneration zone 201 flows downward through a central standpipe 208.

In FIG. 7, the spent catalyst is evenly introduced into the bed through a split annular ring 210 which partially surrounds the central regenerated catalyst standpipe 208 transversing grid 212 at the bottom of the regenerator bed. This annular ring 210 forms one or more annular ducts for transporting and evenly discharging the incoming spent catalyst through the bed. The bottom of the distributor ring is provided with at least one inverted channel for restricting the catalyst discharge and forcing flow to the two ends of the ring. The bottom edges 218 of the sides of the ring may be provided with notches 218 to assist in the more even discharge of catalyst and gas at lower inflowing rates. The distributor ring 210 is shown connected to the inlet conduit 204, which in operation transports spent catalyst into the regenerator bed 200.

Figure 8:
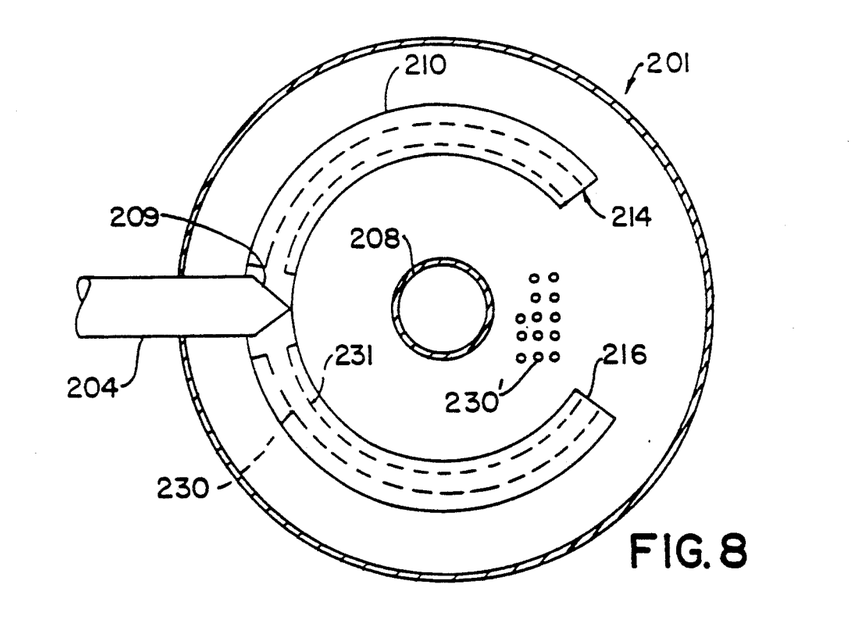
FIG. 8 shows the apparatus of FIG. 7 in plan-view, looking down from the top of the regenerator, wherein it is seen that the spent catalyst distribution system comprises a split annular ring.

FIG. 8 shows the regenerator zone 201 of FIG. 7 in plan view. Illustrative grid holes 230' can be seen, which distribute the incoming regeneration air. The catalyst distribution ring 210 can be seen to extend from the inlet conduit 204. In this embodiment, the ring 210 defines at least one open channel, which extends longitudinally the length of each side of the ring 210, which channel communicates with elongated apertures or outlet slots 230 and 231 which are at least partially co-extensive with the channel. Alternatively, the ring 210 may have a series of shorter slots for the discharge of the catalyst and air.

As shown in FIG. 8, near the juncture 209 of the inlet conduit 204 and the distributor ring 210, the channel is preferably closed at the bottom. The two distal ends of the distributor ring 210 have vapor stops 214 and 216 to block further flow. As mentioned above, the bottom edge 218 of the distributor ring may be toothed along its length. Similar to the distributor arm shown in FIGS. 5 and 6, the ring distributor may have a triangular cross-section to prevent dead catalyst zones from forming above the ring. A bottom piece may also extend along the length of the ring to define two slots for discharge of catalyst and air or other gas. The slots face downward and are dimensioned to ensure that the gas is propelled out, but not so high that erosion occurs. The channel and/or slots may be wider at the ends of the ring channel and narrower at the beginning of the channel to take into account the diminishing velocity of the gas as it escapes through the outlet slots.

A regenerator catalyst collection system is also shown in FIG. 7, wherein a regenerated catalyst outlet conduit 208 is surrounded and partially covered by a substantially cylindrical shroud generally designated 222. The catalyst in the regenerator bed may exit via an annular space 224 and 225 surrounding the outlet funnel shaped portion 226 of the outlet conduit 208. A substantially circular opening 228 at the top portion of the shroud permits the level of the bed to remain uniform.

The present invention can provide a significant reduction of carbon on regenerated catalyst. Since every 0.1 wt. % carbon on catalyst is equal to a gasoline yield loss of about 1 vol. % on feed, there is considerable potential for improved regenerator operation by means of the present invention. The present invention also permits reduced regenerator holdup. This will result in lower catalyst costs due to better activity maintenance, as well as increased unit capacity due to lower bed pressure drop which adds to blower capacity.

A further advantage of the invention is that the gas which is admixed with the spent catalyst is more evenly distributed into the bottom of the bed, which prevents afterburning. This gas has a small quantity of hydrocarbon which has a high hydrogen content. Thus, if it were released in a concentrated area, there would be preferential combustion of this gas as opposed to the combustion of the carbon on the catalyst. This would result in unequal burning in the bed compared to locations where this hydrocarbon were not present. Thus, the combustion gases leaving the bed would have different compositions in different areas. If these compositions were such that there were excess oxygen in one zone and excess CO in other zones, these gases would mix in the dilute phase and afterburning would result. This afterburning would result in excessive temperatures, as there is little catalyst to absorb the heat release.

The present invention may be applied beneficially to a variety of types of fluid cat cracking units with little or no modifications and without limitations as to the spatial arrangement of the reaction, stripping, and regeneration zones thereof. Generally, the regeneration zone of a catalytic cracking unit can be designed independently from the reaction zone, since the regeneration zone merely receives spent catalyst, oxidizes the coke thereon to regenerate the catalyst, and returns the regenerated catalyst to the reaction zone. Therefore, the reaction zone can be a pure transfer line, i.e., one in which the reaction occurs in a single pipe type vessel directly terminating in a rough cut cyclone or cyclones as in FIG. 2, a conventional dilute riser/dense bed combination as in FIG. 1, or a dense bed alone.

While the invention has been described in connection with specific embodiments, it will be understood that this invention is capable of further modification, and that this application is intended to cover any variations, uses or adaptations of the invention, including such departures from the present disclosure as come within known or customary practice in the art to which the invention pertains and as may be applied to the essential features hereinbefore set forth, and as fall within the scope of the invention.

What we claim is:

1. In a fluid catalytic cracking regeneration vessel wherein said regeneration vessel contains a bed of spent catalyst, a grid positioned below the spent catalyst bed for distributing gas which fluidizes and regenerates the spent catalyst and a spent catalyst distribution system for distributing spent catalyst into the regeneration vessel, the improvement wherein the spent catalyst distribution system comprises at least one elongated distributor means having a proximal end connected to an inlet conduit of the regeneration vessel, and a distal end; said at least one distributor means introducing and evenly distributing spent catalyst and admixed gas into the regeneration vessel, wherein said at least one distributor means is provided with a respective bottom piece extending from said proximal end to said distal end thereby defining at least one channel having at least one elongated slot, said at least one channel restricting the catalyst and admixed gas discharge and forcing flow out through at least one said elongated slot and towards the distal end of the at least one distributor means, each distal end having means to block the further flow of spent catalyst and admixed gas.

2. The distribution system of claim 1, further comprising a cap for diverting spent catalyst and admixed gas entering the regenerator through said inlet conduit into said at least one distributor means, each of said distributor means comprises a substantially straight elongated distributor arm located within the catalyst bed in a position substantially parallel to the grid.

3. The distribution system of claim 2, wherein said distributor arms radially extend from said cap.

4. The distribution system of claim 2, wherein said cap is substantially conical in shape.

5. The distribution system of claim 2, wherein each said distributor arm has a triangular cross-section with two downsloping sides to prevent dead catalyst zones from forming above the distributor arm.

6. The distribution system of claim 5, wherein the sides of said distributor arm are toothed along its length to assist in uniform discharge of catalyst and admixed gas from said distributor means.

7. The distribution system of claim 2, wherein each said bottom piece extends along a length of a respective said distributor arm to define said at least one elongated slot extending longitudinally of the arm, which slots are for the discharge of catalyst and admixed gas, wherein the slots face downward.

8. The distribution system of claim 7, wherein said slots are wider at an outlet end thereof and narrower at an inlet end thereof to take into account the otherwise diminishing velocity of the gas as it escapes through the slots.

9. The distribution system of claim 2, wherein the distributor arm radiates from a vertical axis of the cap at an angle thereto.

10. The distribution system of claim 2, wherein said at least one distributor means comprises a ring section forming a plurality of distributor arms.

11. In a fluid catalytic cracking regeneration vessel fluid having a central regenerated catalyst outlet standpipe wherein said regeneration vessel contains a bed of spent catalyst, a grid positioned below the spent catalyst bed for distributing gas which fluidizes and regenerates the spent catalyst and a spent catalyst distribution system for distributing spent catalyst into the regeneration vessel, the improvement wherein the spent catalyst distribution system comprises a split annular distributor ring being connected to an inlet conduit of the regeneration vessel and at least partially surrounding said central regenerated catalyst outlet standpipe, said ring having two opposing proximal ends connected to said inlet conduit and two closed distal ends respectively extending away from said two proximal ends; wherein said distributor ring is provided with a bottom piece extending from said proximal ends to said distal ends thereby defining two annual channels for transporting and evenly discharging spent catalyst entering the bed of the regenerator, and each said two annular channels having a respective elongated annular slot, said two channels restricting the catalyst and admixed gas discharge and forcing flow out through said elongated annular slots and towards the two distal ends of the distribution ring.

12. The distribution system of claim 11, wherein the sides of the distributor ring are provided with notches to assist in more evenly discharging the catalyst and admixed gas.

13. The distribution system of claim 11, wherein the distal ends of the distributor ring have vapor stop means to block further flow.

14. The distribution system of claim 11, wherein the distributor ring has a triangular cross-section and two down-sloping sides to prevent dead catalyst zones from forming on top of the distributor ring.

* * * * *